US008280869B1

(12) United States Patent
Burger et al.

(10) Patent No.: US 8,280,869 B1
(45) Date of Patent: Oct. 2, 2012

(54) SHARING INTERMEDIATE RESULTS

(75) Inventors: Louis Martin Burger, Escondido, CA (US); Thomas Patrick Julien, San Diego, CA (US); Douglas P. Brown, Rancho Santa Fe, CA (US); Jeffrey S. Shelton, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 268 days.

(21) Appl. No.: 12/500,680

(22) Filed: Jul. 10, 2009

(51) Int. Cl.
*G06F 17/00* (2006.01)

(52) U.S. Cl. ............................................... 707/706

(58) Field of Classification Search .................. 707/706
See application file for complete search history.

(56) References Cited

U.S. PATENT DOCUMENTS

| | | | | |
|---|---|---|---|---|
| 1,382,246 | A * | 6/1921 | Sandell | 335/64 |
| 5,347,652 | A * | 9/1994 | Epstein et al. | 1/1 |
| 5,864,842 | A * | 1/1999 | Pederson et al. | 1/1 |
| 6,275,820 | B1 * | 8/2001 | Navin-Chandra et al. | 1/1 |
| 6,341,281 | B1 * | 1/2002 | MacNicol et al. | 1/1 |
| 6,343,286 | B1 * | 1/2002 | Lee et al. | 1/1 |
| 6,633,867 | B1 * | 10/2003 | Kraft et al. | 705/26.1 |
| 2005/0076130 | A1 * | 4/2005 | Anand et al. | 709/228 |
| 2005/0097100 | A1 * | 5/2005 | Galindo-Legaria et al. | 707/3 |
| 2006/0020576 | A1 * | 1/2006 | Karube | 707/2 |
| 2007/0233671 | A1 * | 10/2007 | Oztekin et al. | 707/5 |
| 2008/0021889 | A1 * | 1/2008 | Nam et al. | 707/3 |
| 2008/0214155 | A1 * | 9/2008 | Ramer et al. | 455/414.1 |
| 2009/0006328 | A1 * | 1/2009 | Lindberg et al. | 707/3 |
| 2011/0040746 | A1 * | 2/2011 | Handa et al. | 707/721 |
| 2011/0246479 | A1 * | 10/2011 | Chen et al. | 707/743 |

OTHER PUBLICATIONS

Y Ding, A compiler scheme for reusing intermediate computation results, International Symposium on Code Generation and Optimization, Mar. 2004.*

* cited by examiner

*Primary Examiner* — Charles Kim
*Assistant Examiner* — Kurt Mueller
(74) *Attorney, Agent, or Firm* — Howard Speight (57) ABSTRACT

A temporary computer-stored first-unit intermediate result is generated while executing a first unit of work on a computer-based database management system. The first-unit intermediate result has properties. It is determined that the properties of the first-unit intermediate result are similar to properties of a second-unit intermediate result to be generated for a second unit of work when the second unit of work is executed on the computer-based database management system. In response, the first-unit intermediate result is saved for use in executing the second unit of work.

15 Claims, 6 Drawing Sheets

FIG. 5
WORKLOAD ANALYZER
PROCESSING

FIG. 6
WORKLOAD ANALYZER
PROCESSING PRODUCING
MATERIALIZED VIEW
DEFINITIONS

SHARING INTERMEDIATE RESULTS

BACKGROUND

It is sometimes useful in database query optimization to share intermediate results. An intermediate result is produced in the process of performing a database operation, such as a request or a query. For example, a SQL query might cause a number of rows to be read from a database table and temporarily stored in a spool file. The spool file is an example of an intermediate result. Such an intermediate result might be used in later processing of the query to produce another intermediate result or to produce the final result of the query. It is sometimes useful in optimizing the execution of a query to share intermediate results with various parts of the processing of the query. Due to the architecture of SQL engines, optimizations such as these are typically limited to the context of a single request submitted by a client. Likewise, the lifetime of internally generated spool files is typically limited to a single request.

SUMMARY

In one aspect, the invention features a computer-based method. The method includes generating a temporary computer-stored first-unit intermediate result while executing a first unit of work on a computer-based database management system. The first-unit intermediate result has properties. The method further includes determining that the properties of the first-unit intermediate result are similar to properties of a second-unit intermediate result to be generated for a second unit of work when the second unit of work is executed on the computer-based database management system. In response, the method includes saving the first-unit intermediate result for use in executing the second unit of work. The first unit of work is part of a first request. The second unit of work is part of a second request different from the first request.

Implementations of the invention may include one or more of the following. The first-unit intermediate result is an intermediate result may be selected from the group consisting of a definition of a materialized view and a spool file. Determining that the properties of the first-unit intermediate result are similar to the properties of the second-unit intermediate result may include defining properties of a spool file that will be required when executing the second unit of work and finding that the properties of the temporary computer-stored intermediate result are identical to the properties of the spool file. The method may further include determining that intermediate-result-dropping conditions have been met with respect to the first-unit intermediate result and, in response, deleting the first-unit intermediate result. The method may further include delaying execution of the second unit of work, placing a definition of the second-unit intermediate result on a needs list, placing a definition of the first-unit intermediate result on a saved list, and mapping in an assignments list the definition of the second-unit intermediate result in the needs list to the definition of the first-unit intermediate result in the saved list. The method may further include determining that a definition for a no-longer-useful intermediate result in the saved list is not mapped to any definitions of intermediate results on the needs list, and, in response deleting the definition for the no-longer-useful intermediate result from the saved list and deleting the no-longer-useful intermediate result. The method may further include transferring ownership of the first-unit intermediate result from the first unit of work to the second unit of work.

In another aspect, the invention features a database system. The database system includes one or more nodes. The database system further includes a plurality of CPUs, each of the one or more nodes providing access to one or more CPUs. The database system further includes a plurality of virtual processes, each of the one or more CPUs providing access to one or more virtual processes. Each virtual process is configured to manage data, including rows from the set of database table rows, stored in one of a plurality of data-storage facilities. The database system further includes a process. The process generates a temporary computer-stored first-unit intermediate result while executing a first unit of work on a computer-based database management system, the first-unit intermediate result having properties. The process further determine that the properties of the first-unit intermediate result are similar to properties of a second-unit intermediate result to be generated for a second unit of work when the second unit of work is executed on the computer-based database management system, and, in response, saves the first-unit intermediate result for use in executing the second unit of work. The first unit of work is part of a first request. The second unit of work is part of a second request different from the first request.

In another aspect, the invention features a computer program, stored in a tangible medium. The program includes executable instructions that cause a computer to generate a temporary computer-stored first-unit intermediate result while executing a first unit of work on a computer-based database management system, the first-unit intermediate result having properties. The program further includes executable instructions that cause the computer to determine that the properties of the first-unit intermediate result are similar to properties of a second-unit intermediate result to be generated for a second unit of work when the second unit of work is executed on the computer-based database management system, and, in response save the first-unit intermediate result for use in executing the second unit of work. The first unit of work is part of a first request. The second unit of work is part of a second request different from the first request.

DETAILED DESCRIPTION

Figure 1:
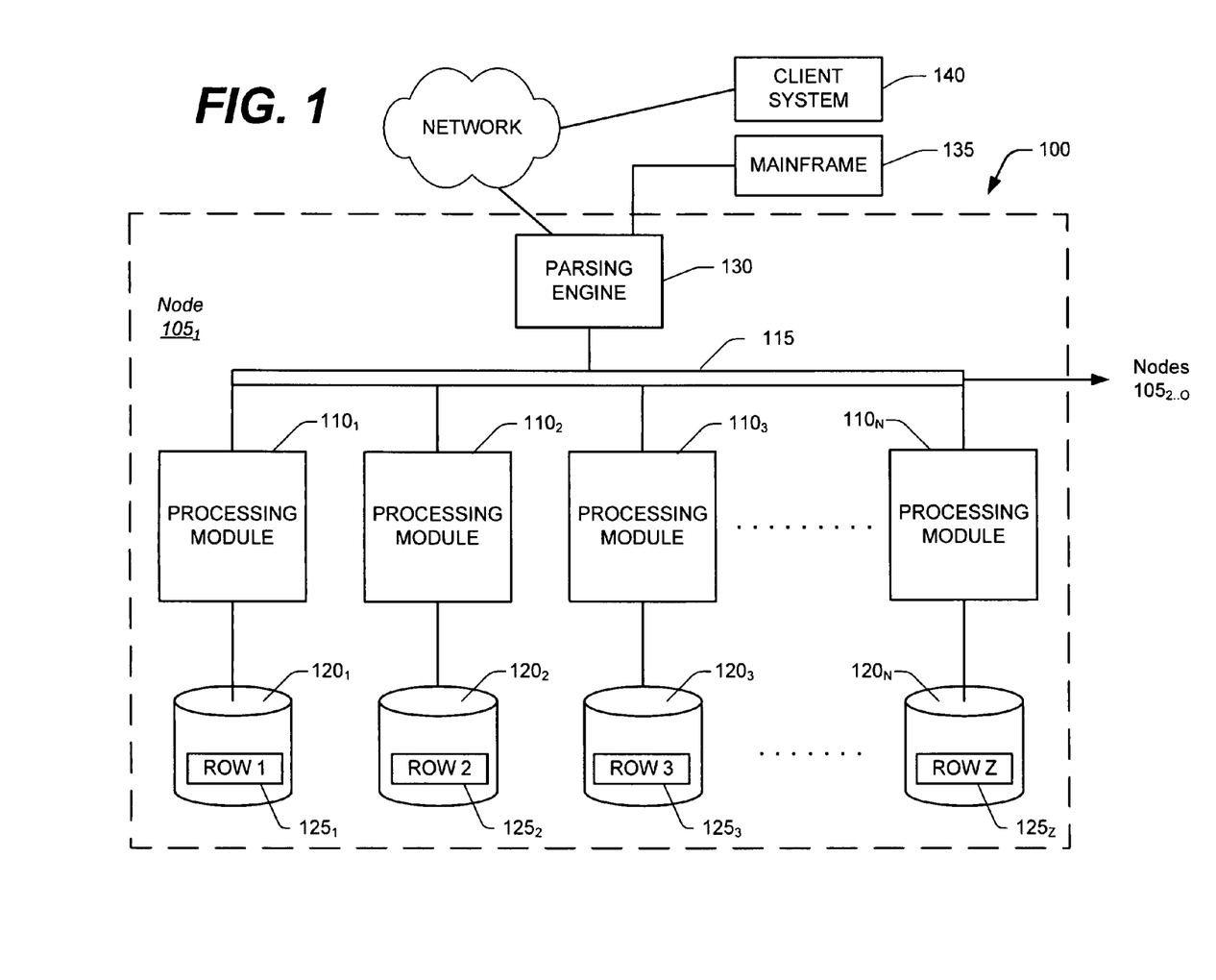
FIG. 1 is a block diagram of a node of a database system.

The optimization technique disclosed herein has particular application, but is not limited, to large databases that might contain many millions or billions of records managed by a database system ("DBS") 100, such as a TERADATA® Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
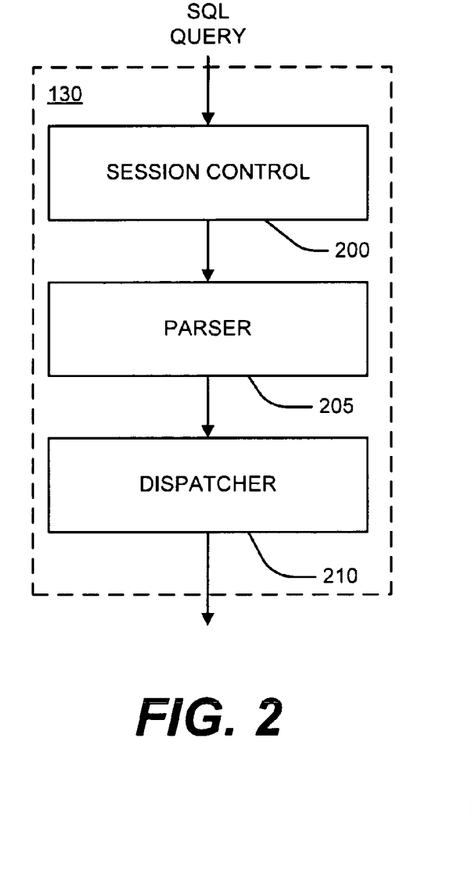
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
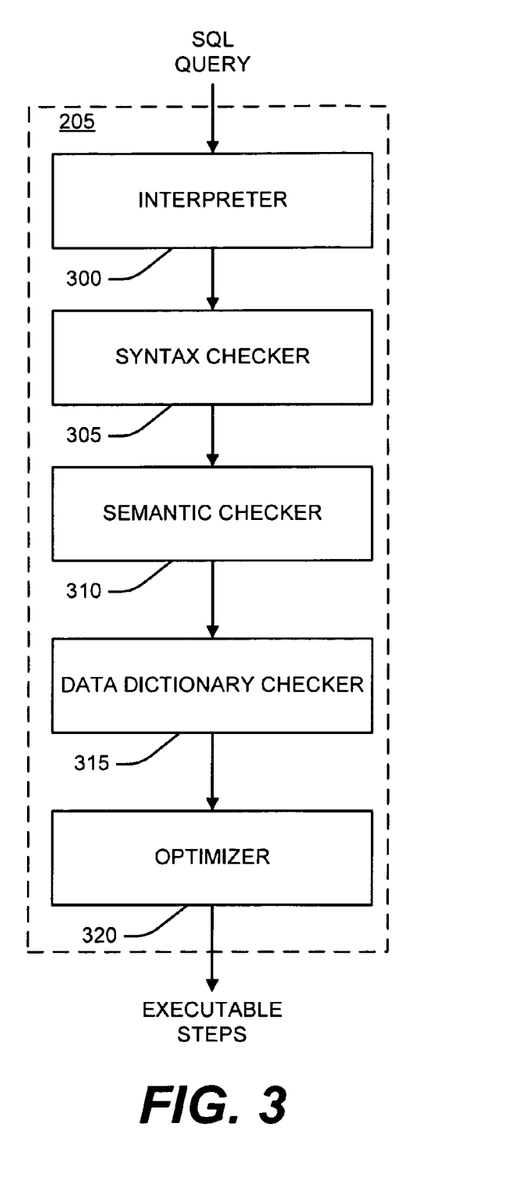
FIG. 3 is a flowchart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1...N}$ to implement the executable steps.

Virtually all customer workloads (or any related set of SQL statements that perform a "unit of work") consist of multiple SQL requests and often consist of multiple transactions. In one embodiment, intermediate results are shared between units of work that span multiple user requests.

Sharing Intermediate Results within a Workload

In one embodiment, the sharing context is a workload. In one embodiment, a workload is a set of requests which are related in some way. For example, in one embodiment, the requests may be related by the degree of service expected from the database system, by their urgency, or by their source. A request may be a query (such as a SQL query) or it may be a utility.

One embodiment of a system for sharing intermediate results recognizes that materialized views (e.g., join indexes, which is the proprietary name of the TERADATA® feature that implements materialized views) can be used to share common intermediate results across user requests in much the same fashion as internal spool files are used within a single request. The identification of common intermediate results benefits from intimate knowledge of internal plan processing and spool properties and hence can be handled by involving the optimizer itself. Furthermore, it is typically not possible to identify the majority of common intermediate results via a simple examination of the SQL syntax.

Figure 4:
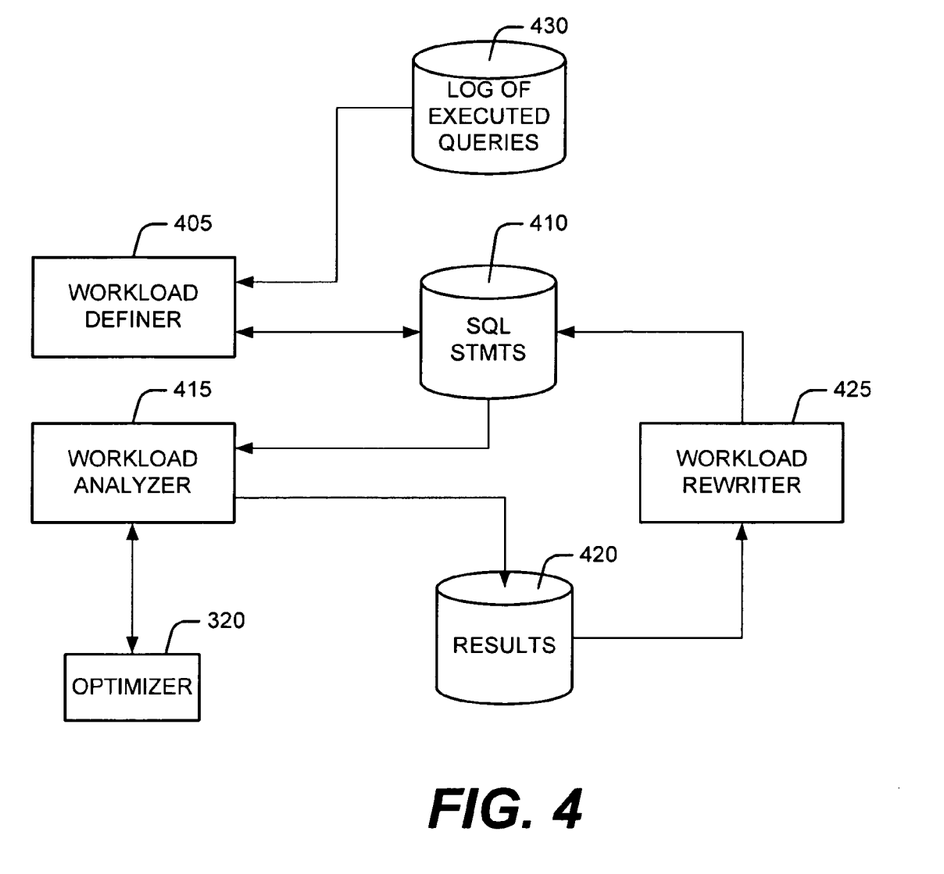
FIG. 4 is a block diagram of a system for sharing intermediate results.

In one embodiment, a system for sharing intermediate results, illustrated in FIG. 4, operates within the context of a system management process and consists of three major components: (1) a "Workload Definer" 405 responsible for identifying or marking the set of related SQL statements 410 that comprise a relevant "unit of work", (2) a "Workload Analyzer" 415 capable of invoking the native optimizer 320 for one or more SQL requests and analyzing the resulting execution plans including any intermediate results to produce Analyzer results 420 and (3) a "Workload Rewriter" 425 that uses the Analyzer results to modify (or add to) the SQL statements of the defined workload in an effort to improve performance.

In one embodiment, the Workload Definer is responsible for identifying a set of SQL statements that perform a user defined unit of work and that are likely to be querying similar sets of data. In one embodiment, this set of SQL statements is a "workload." In one embodiment, such statements are extracted from a log of executed queries 430 based on user specified criteria. In one embodiment, the SQL text of the identified statements are marked and/or stored in a repository (not shown). In one embodiment, the ordered sequence of the statements, which may include updates, is recorded to allow the Workload Rewriter 425 to identify the optimal points in which to dynamically create and drop materialized views.

Figure 5:
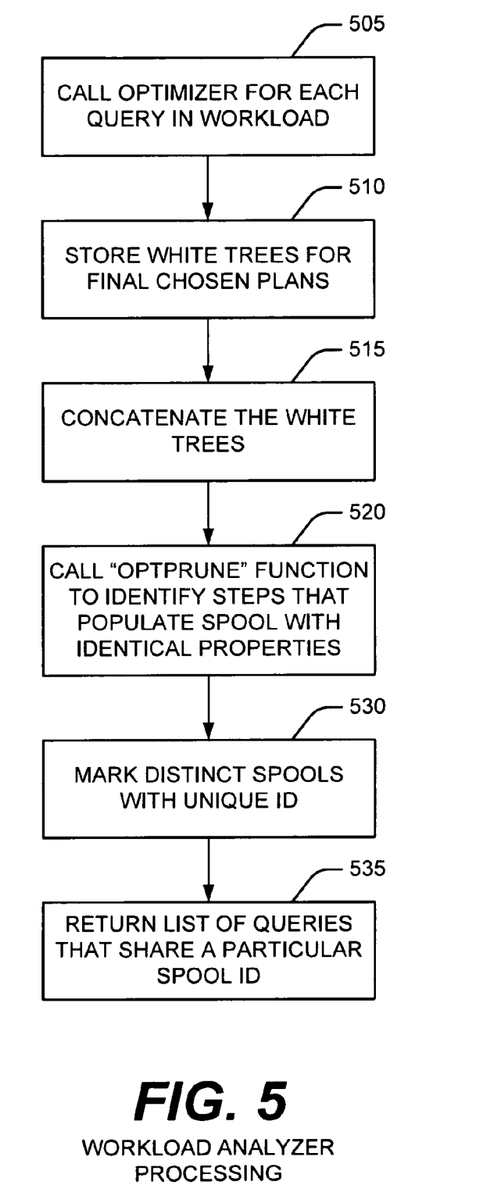
FIG. 5 is a flow chart of workload analyzer processing.

In one embodiment, the Workload Analyzer 415 examines the combined execution plan steps for all of the workload queries and identifies those steps that generate common spool files. In one embodiment, illustrated in FIG. 5, it does this by (i) calling the optimizer for each of the queries in the workload (block 505), (ii) storing each of the final chosen plans in the form of "white trees" (where a "white tree" is an internal in-memory data structure used by TERADATA® to represent the optimizer's chosen execution plan; a white tree consists of one or more steps each representing a low level database operation (e.g., scan, join, aggregate) that operates on one or more tables or spools) within its workload cache memory (block 510), (iii) concatenating the white trees to form a single list of execution steps (block 515), and (iv) calling an unmodified 'optprune' function to identify those steps that populate a spool with identical properties (block 520). In one embodiment, each distinct spool is marked with a unique id (block 530) and lists of queries that share a particular spool id are returned (block 535). In one embodiment, the result of this analysis is intended to be used by the end user to manually reorganize their workload in an effort to co-locate into the same request those statements sharing common spools.

Figure 6:
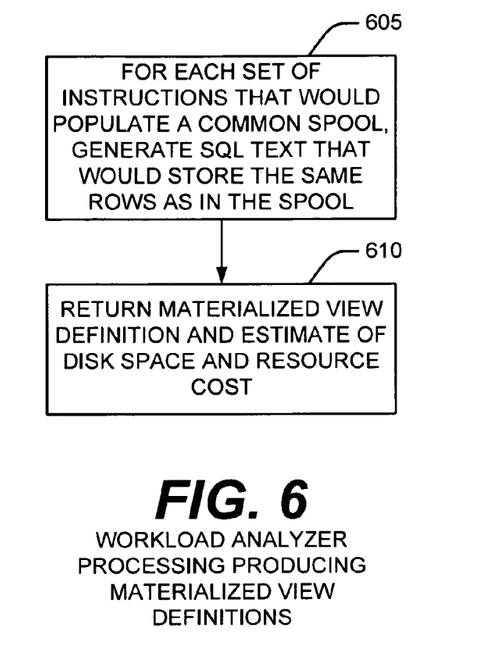
FIG. 6 is a flow chart of workload analyzer processing producing materialized view definitions.

In addition, in one embodiment, the Workload Analyzer generates the definitions of materialized views that when created would hold derived results that are equivalent to those stored in common spool files. To accomplish this, as shown in FIG. 6, the Workload Analyzer examines the instructions contained within each internal step that populates a common spool and generates the corresponding SQL text in the form "SELECT . . . FROM . . . WHERE" that when defined within the body of a join index definition would store the same rows as those in the spool (block 605). For example, given a white tree step that executes a retrieve operation from a single table (e.g., the TERADATA® RET step), the Workload Analyzer examines the assignment list and conditions applied by the RET step and generates the corresponding SELECT expression list and WHERE clause. Note that, in one embodiment, the generation of materialized view definitions is limited to those common spools that are used across multiple requests; common spools limited to a single request can continue to use spool files rather than materialized views. In one embodiment, along with each common spool's materialized view definition, the Workload Analyzer returns the optimizer's estimated disk space for the spool and the resource cost required to populate it (block 610).

In one embodiment, the Workload Rewriter component 425 uses the information returned by the Workload Analyzer to automatically modify the SQL of the user's defined workload such that future executions perform more efficiently. More specifically, in one embodiment, CREATE and DROP JOIN INDEX statements are added at the appropriate points in the workload to populate materialized views that can be used in subsequent query plans chosen by the Optimizer. Because a given query plan was already incurring the cost of having to populate a common spool, the extra overhead of creating a Join Index with the same results is only marginal.

When optimizing workload queries that occur after the inserted CREATE JOIN INDEX, in one embodiment the optimizer 320 will automatically consider reading directly from the new join index table rather than executing a Retrieve or Join step to populate a spool. Because the Join Index was specifically designed to replace a spool population step in the previously examined optimal plan, in one embodiment it is almost guaranteed that the optimizer will choose to use it because it avoids this extra cost.

In one embodiment, the classes of join indexes generated are meant to be used as covering materialized views rather than index structures with rowids (pointers) to the corresponding base table rows. Thus, in one embodiment, in an effort to reduce creation and maintenance costs, the join index definitions will not contain ROWIDs. Because, in one embodiment, join indexes are automatically maintained by the system during updates, a particular join index representing a common intermediate result can be used across transactions without compromising correctness from updates executing inside or outside of the workload.

Further, if it is not feasible to create a separate join index for every common spool identified by the Workload Analyzer 415, in one embodiment the Workload Rewriter 425 can use the returned disk space and resource cost information to prioritize and choose the subset of Join Indexes that will minimize the overall workload cost without exceeding a predefined disk space limit.

Sharing Intermediate Results Among Active Requests and Delayed Requests

One embodiment extends the context of the optimizer's existing single request optimization for sharable spool files to include pending or delayed queries that have already been parsed and optimized but not yet executed.

Many commercial database products offer workload management features that can reject or delay SQL queries based on their estimated impact on system performance. In TERADATA®, these features operate within the context of the TERADATA® Active System Management (TASM) subsystem. In one embodiment, using TASM, database administrators can define rules and criteria that identify expensive or inefficient queries and enforce them prior to query execution. In one embodiment, such rules are enforced automatically within TASM by examining the Optimizer's query plan steps to determine the types of operations as well as their estimated resource usage. In one embodiment, for each TASM rule defined, the user can also define the corrective action that should be applied when a given rule is violated. One common action is to delay the execution of the query to a less critical time when the impact to system performance would be less severe while still retaining the optimizer's plan in the TASM queue.

Figure 7:
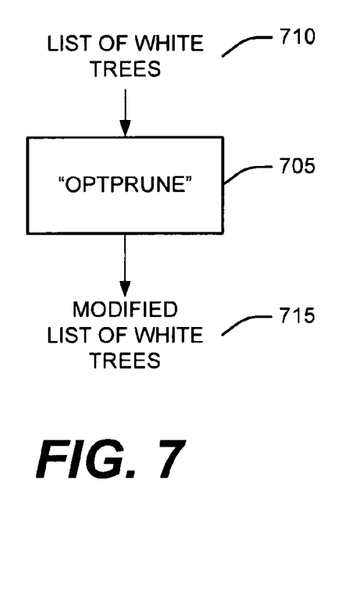
FIG. 7 is a flow chart showing "optprune" processing.

One embodiment recognizes that the identification of common intermediate results requires intimate knowledge of internal plan processing and spool properties and hence is best handled by involving the optimizer itself. In one embodiment, it may not possible to identify the majority of common intermediate results via a simple examination of the SQL syntax. The TERADATA® optimization phase that identifies and removes duplicate spool files (and their associated population steps), illustrated in FIG. 7, is called 'optprune' 705 where the term "prune" denotes the fact that plan steps are represented by a tree data structure. The input 710 to optprune is a list of "white trees" representing the Optimizer's chosen query plan steps and its output 715 is a modified list of white trees with duplicate steps (and corresponding spools) removed and the associated spool references changed to refer to the common spool instance.

Figure 8:
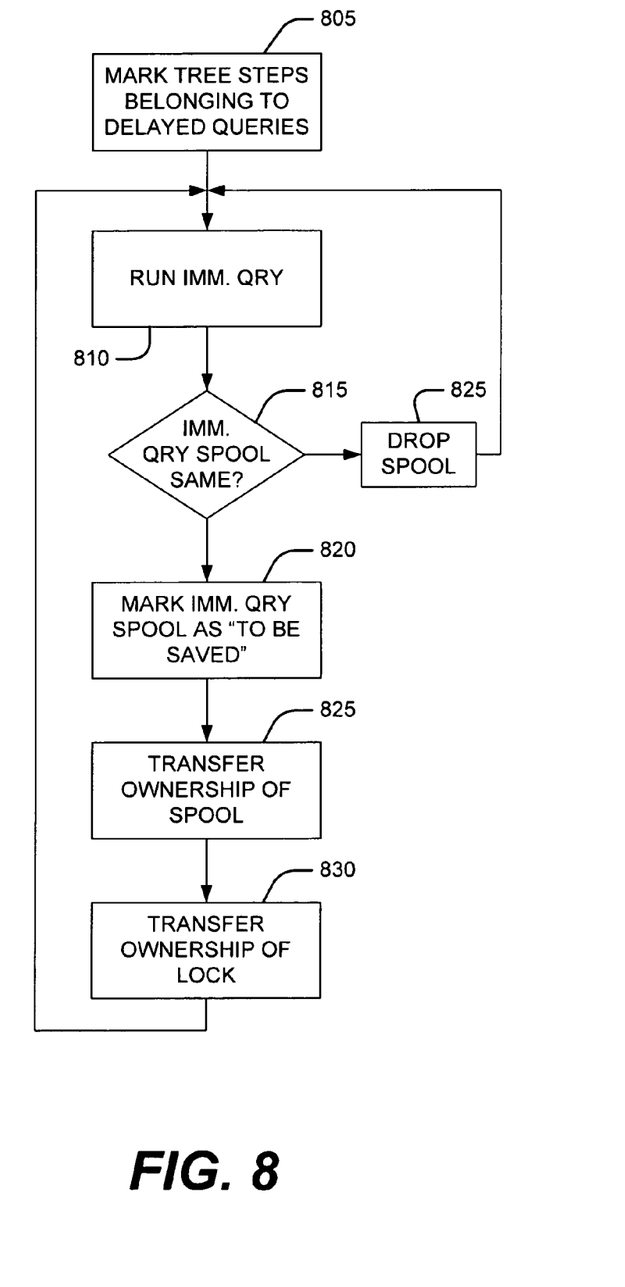
FIG. 8 is a flow chart showing enhanced "optprune" processing.

One embodiment, illustrated in FIG. 8, extends the 'optprune' process to also consider the white tree steps of queries residing in the TASM delay queue. In one embodiment, tree steps belonging to delayed queries are marked to distinguish them from steps belonging to queries that are scheduled for immediate execution (i.e., not delayed) (block 805). In one embodiment, if, in the process of running an immediate query (block 810), optprune determines that the properties of a spool being populated by an immediate query are identical (or very similar) to those associated with a delayed query plan step (block 815), the immediate query's spool is marked as "to be saved" (block 820) which in turn alerts the runtime step execution subsystem that the spool should not be dropped after its usage. Note: In TERADATA®, spools are ordinarily dropped immediately after their last use in a given request (block 825).

In one embodiment, the maintenance of spool objects in the system requires that they be owned by a transaction where transactions have unique identifiers. Hence, in one embodiment, ownership of the spool object is transferred from the currently running transaction to the delayed request which can be assigned a special pseudo-transaction identifier by TASM (block 825). In addition, during the population of a shared spool, read locks were applied to the base tables from which the rows came from. In one embodiment, to ensure correct results for the delayed query, these locks are retained to prevent the base data from being updated by other requests. To accomplish this, in one embodiment, the ownership of the locks is transferred from the currently running transaction to a pseudo-transaction id of the identified delayed query (block 830).

It is recognized that the optimization described in this solution should be applied judiciously. First, it is not cost effective to retain small spools whose population costs are minimal. In one embodiment, as part of the tree step that populates a given spool, the optimizer 320 includes its estimated cost which in turn can be used by optprune to limit the identification of saved spools to those whose population cost exceeds a configurable threshold. Secondly, in one embodiment, already saved spools are not retained indefinitely waiting for a delayed query to become activated. Doing so would have adverse affects on other requests that are blocked on the associated read locks and valuable spool space would be tied up. Hence, in one embodiment, TASM periodically monitors the existence of saved spools owned by delayed queries and drops them if certain negative conditions are detected such as:

- The elapsed time since the ownership of a saved spool was transferred to a delayed query exceeds a configurable threshold.
- The available spool space in the database (or user) in which the saved spool resides is less than a configurable amount or "out of spool" exceptions are detected by TASM.
- The number of blocked requests (or the time a given request has blocked) on the Read locks owned by a pseudo-transaction of a delayed query exceeds a configurable threshold Example Illustrating Sharing Intermediate Results Among Active Requests and Delayed Requests The example queries given below reference the TPC-H benchmark database (http://www.tpc.org/tpch/). In one embodiment, the Optimizer's 320 execution plan for each of the queries consists of a series of steps that perform operations such as single table retrieve (RET), binary join (JOIN), and aggregation (SUM). Because both queries involve customers from the Automobile market segment, it is very likely that both execution plans will execute an identical RET step on the 'customer' table that applies a condition of (c_mktsegment='AUTOMOBILE') and stores the intermediate result in a spool file.

Assuming Query #1 is chosen for immediate execution and Query #2 is delayed, the above mentioned spool file containing Automobile customers can be marked as "to be saved" in the execution plan of Query #1. After it completes execution, it will then transfer ownership of the saved spool to Query #2.

In one embodiment, the decision of whether to save this particular spool is further controlled by a configurable threshold whose goal is to limit the optimization to large spools. For example, the saving of Automobile customers for subsequent queries could be limited to those cases where its estimated spool size is greater than 10,000 rows or 10 Megabytes.

/* Query #1—Automobile customers who have made orders in excess of $100,000 in the current calendar year */
SELECT DISTINCT c_name, SUM(o_totalprice) FROM customer, orders WHERE o_custkey=c_custkey AND c_mktsegment='AUTOMOBILE'
AND o_orderdate>='2009-01-01'
GROUP BY c_name
HAVING SUM(o_totalprice)>100000.00

/* Query #2—contact info for Automobile customers in the North American region who have not placed any orders in the current calendar year */
SELECT c_name, c_phone FROM customer, nation, region WHERE c_nationkey=n_nationkey AND n_regionkey=r_regionkey AND r_name='NORTH AMERICA'
AND c_mktsegment='AUTOMOBILE'
AND NOT EXISTS
(SELECT *
FROM orders
WHERE o_custkey=c_custkey AND o_orderdate>='2009-01-01')

Sharing Intermediate Results Among Potentially all Requests in the System

One embodiment maintains a system wide list of delayed queries along with definitions of the associated spools they require and applies intelligent heuristics to decide when to save spools of currently executing queries for later use by one or more of these delayed queries. In one embodiment, this solution is implemented within the context of a system's automated management subsystem. Many commercial database products offer system management features that examine the optimized plans of incoming queries with the purpose of rejecting or delaying those whose estimated resource usage violates user-defined criteria. In TERADATA®, such features are part of the TASM subsystem.

Figure 9:
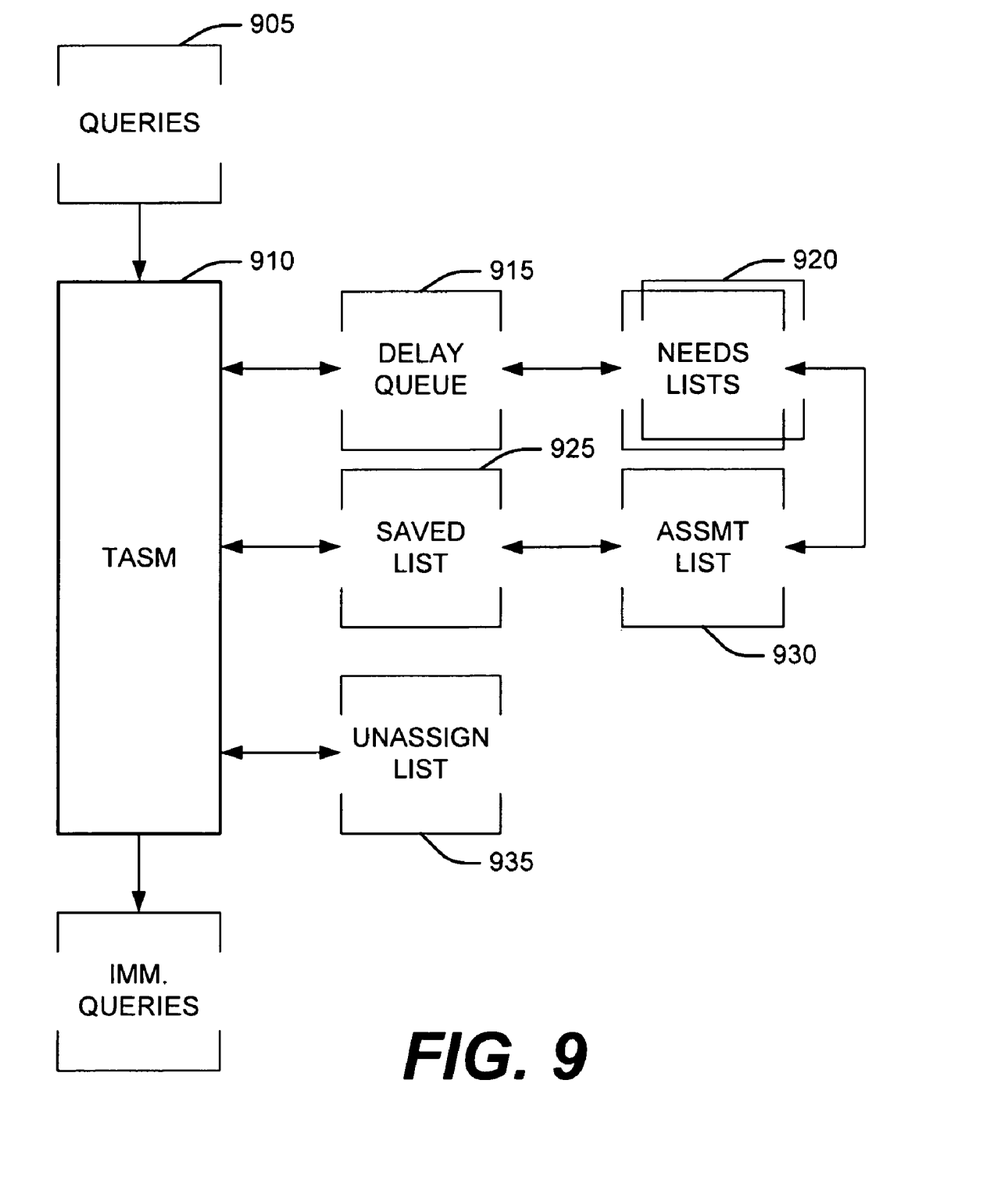
FIG. 9 is a block diagram of a system for sharing intermediate results.

As illustrated in FIG. 9, when a query 905 (which may be from a queue of queries) is delayed by TASM 905, it will be placed in a "Delay Queue" 915 along with a "Needs List" 920 composed of definitions of spool files it will require when it finally executes. In one embodiment, the system includes a separate Needs List for each delayed query. In one embodiment, the system includes one or more consolidated Needs List for more than one delayed query. In one embodiment, TASM 910 will record the properties of each spool including its projected columns and expressions, applied conditions, and physical demographics such as sort order. In one embodiment, care is taken to store at most one instance of a spool definition with a given set of properties; the Needs Lists of multiple queries requiring the same spool will all refer to the same spool definition entry.

In one embodiment, when a non-delayed query plan is passed to the dispatcher 210 for immediate execution, each of its spools are considered for "recycling" and if chosen its definition is stored in a "Saved List" 925 maintained by TASM 910. Spools marked for recycling are not deleted by the runtime execution system as they normally would immediately after their use in the current query. In one embodiment, when a delayed query is finally passed to the dispatcher 210 for execution, any of its spools appearing in the "Needs Lists" 920 of other (still delayed) queries are also considered for recycling in the same fashion as done for non-delayed queries. In one embodiment, no more than one instance of a spool with a given set of properties is saved for recycling by TASM 910.

In one embodiment, for each recycled/saved spool, TASM 910 will maintain an "Assignment List" 930 to serve as a mapping between it and any matching spools from one or more Needs Lists 920. In one embodiment, by default, TASM 910 will not recycle a spool if there is no matching spool definitions found in a 'Needs List'. However, in one embodiment, by changing a configuration parameter, such spools can be retained and kept in a separate "Unassigned List" 935 under the assumption that a future query may need them. In one embodiment, Assignment Lists 930 are maintained when a query is initially added to the Delay Queue 915. In one embodiment, there is a separate Assignment List 930 for each save query. In one embodiment, the Assignment List 930 is a consolidated list of all mappings. A search of the "Saved List" 925 is made for each spool in the newly added "Needs List" 920 and if a match is found it is added to that saved spool's Assignment List 930.

In one embodiment, the Assignment Lists 930 serve two primary purposes. First, in one embodiment, when a delayed query is passed to the dispatcher 210 for execution, the mapping makes it possible to replace any plan references to saved spools to the underlying populated physical spool (i.e., its internal identifier). At the completion of execution, in one embodiment, the previously delayed query is removed from the Delay Queue 915 along with its Needs List 920. In addition, in one embodiment, any of its spools appearing in Assignment List 930 are also removed. In one embodiment, the second major purpose of the Assignment List 930 is to detect the condition in which a given saved spool is no longer needed by any remaining delayed query. In one embodiment, when an Assignment List 930 becomes empty, the associated saved spool is either removed altogether or transferred to the Unassigned List 935 depending on the previously mentioned configuration parameter.

In one embodiment, the execution of non-delayed queries can make use of recycled spools in much the same fashion as delayed queries. One method to leverage the previously outlined implementation is to temporarily consider such queries as being delayed by adding them to the Delay Queue 915 and adding them to the Assignment List 930. However, in one embodiment, rather than adding them to the rear of the queue, they are added to the front of the queue for immediate execution.

Note that in the above-described logic, the standard optimizer 320 is unaware of the spool sharing (recycling) being performed. However, in one embodiment, the optimizer 320 exposes a programming interface or function call that will use standard optimizer logic to compare two spool definitions.

In one embodiment, the maintenance of spool objects requires that they be owned by a transaction where transactions have unique identifiers. Hence, in one embodiment, the retention of spools for later use by delayed queries requires the transfer of ownership of the spool object from the currently running transaction to a delayed query which can be assigned a special pseudo-transaction identifier by TASM 910. In one embodiment, the delayed query chosen to receive ownership is the first one in the saved spool's Assignment List 930 where the spools in the Assignment List 930 are ordered by their associated query's position in the Delay Queue 915.

In one embodiment, in addition to transaction identifiers, the population of a spool requires read locks to be applied to the base tables from which the rows came from. To ensure correct results for any subsequent use by a delayed query, in one embodiment, these locks are retained to prevent the base data from being updated by other requests. To accomplish this, in one embodiment, the ownership of the locks are transferred from the currently running transaction to the pseudo-transaction id of the identified delayed query.

In one embodiment, it is recognized that the recycling optimization must be applied judiciously. First, it is not cost effective to recycle small spools whose population costs are minimal. In one embodiment, as part of the plan step that populates a given spool, the optimizer 320 includes its estimated cost which in turn can be used by TASM 910 to limit the identification of saved spools to those whose population cost exceeds a configurable threshold. Secondly, in one embodiment, already saved spools are not retained indefinitely waiting for a delayed query to become activated. Doing so would have adverse affects on other requests that are blocked on the associated read locks and valuable spool space would be tied up. Hence, in one embodiment, TASM is enhanced to periodically monitor the existence of saved spools and drop them if certain negative conditions are detected such as:

The available spool space in the database (or user) in which the saved spool resides is less than a configurable amount or "out of spool" exceptions are detected by TASM. In such cases, any saved spools appearing in the Unassigned List are deleted first.

A query ready for immediate execution blocks on the Read locks owned by a pseudo-transaction of a delayed query. In this case, the saved spool is deleted and the associated locks freed.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method, comprising:

generating a temporary computer-stored first-unit intermediate result while executing a first unit of work on a computer-based database management system, the first-unit intermediate result having properties;

determining that the properties of the first-unit intermediate result are similar to properties of a second-unit intermediate result to be generated for a second unit of work when the second unit of work is executed on the computer-based database management system, and, in response:

saving the first-unit intermediate result for use in executing the second unit of work;

delaying execution of the second unit of work;

placing a definition of the second-unit intermediate result on a needs list;

placing a definition of the first-unit intermediate result on a saved list; and mapping in an assignments list the definition of the second-unit intermediate result in the needs list to the definition of the first-unit intermediate result in the saved list;

determining that a definition for a no-longer-useful intermediate result in the saved list is not mapped to any definitions of intermediate results on the needs list, and, in response:

deleting the definition for the no-longer-useful intermediate result from the saved list; and deleting the no-longer-useful intermediate result;

the first unit of work being part of a first request; and the second unit of work being part of a second request different from the first request.

2. The computer-based method of claim 1 wherein the first-unit intermediate result is an intermediate result selected from the group consisting of a definition of a materialized view and a spool file.

3. The computer-based method of claim 1 wherein determining that the properties of the first-unit intermediate result are similar to the properties of the second-unit intermediate result comprises:

defining properties of a spool file that will be required when executing the second unit of work; and finding that the properties of the temporary computer-stored intermediate result are identical to the properties of the spool file.

4. The computer-based method of claim 1 further comprising:
   determining that intermediate-result-dropping conditions have been met with respect to the first-unit intermediate result and, in response, deleting the first-unit intermediate result.

5. The computer-based method of claim 1 further comprising:
   transferring ownership of the first-unit intermediate result from the first unit of work to the second unit of work.

6. A database system comprising:
   one or more nodes;
   a plurality of CPUs, each of the one or more nodes providing access to one or more CPUs;
   a plurality of virtual processes, each of the one or more CPUs providing access to one or more virtual processes;
   each virtual process configured to manage data, including rows from the set of database table rows, stored in one of a plurality of data-storage facilities;
   a process to:
      generate a temporary computer-stored first-unit intermediate result while executing a first unit of work on a computer-based database management system, the first-unit intermediate result having properties;
      determine that the properties of the first-unit intermediate result are similar to properties of a second-unit intermediate result to be generated for a second unit of work when the second unit of work is executed on the computer-based database management system, and, in response:
         save the first-unit intermediate result for use in executing the second unit of work;
      delay execution of the second unit of work;
      place a definition of the second-unit intermediate result on a needs list;
      place a definition of the first-unit intermediate result on a saved list;
      map in an assignments list the definition of the second-unit intermediate result in the needs list to the definition of the first-unit intermediate result in the saved list;
      determine that a definition for a no-longer-useful intermediate result in the saved list is not mapped to any definitions of intermediate results on the needs list, and, in response:
         delete the definition for the no-longer-useful intermediate result from the saved list; and
         delete the no-longer-useful intermediate result;
      the first unit of work being part of a first request; and
      the second unit of work being part of a second request different from the first request.

7. The database system of claim 6 wherein the first-unit intermediate result is an intermediate result selected from the group consisting of a definition of a materialized view and a spool file.

8. The database system of claim 6 wherein to determine that the properties of the first-unit intermediate result are similar to the properties of the second-unit intermediate result, the process:
   defines properties of a spool file that will be required when executing the second unit of work; and
   finds that the properties of the temporary computer-stored intermediate result are identical to the properties of the spool file.

9. The database system of claim 6 wherein the process further:
   determines that intermediate-result-dropping conditions have been met with respect to the first-unit intermediate result and, in response, deletes the first-unit intermediate result.

10. The database system of claim 6 wherein the process further:
    transfers ownership of the first-unit intermediate result from the first unit of work to the second unit of work.

11. A computer program, stored in a non-transitory computer readable storage medium, the program comprising executable instructions that cause a computer to:
    generate a temporary computer-stored first-unit intermediate result while executing a first unit of work on a computer-based database management system, the first-unit intermediate result having properties;
    determine that the properties of the first-unit intermediate result are similar to properties of a second-unit intermediate result to be generated for a second unit of work when the second unit of work is executed on the computer-based database management system, and, in response:
       save the first-unit intermediate result for use in executing the second unit of work;
    delay execution of the second unit of work;
    place a definition of the second-unit intermediate result on a needs list;
    place a definition of the first-unit intermediate result on a saved list;
    map in an assignments list the definition of the second-unit intermediate result in the needs list to the definition of the first-unit intermediate result in the saved list;
    determine that a definition for a no-longer-useful intermediate result in the saved list is not mapped to any definitions of intermediate results on the needs list, and, in response:
       delete the definition for the no-longer-useful intermediate result from the saved list; and
       delete the no-longer-useful intermediate result;
    the first unit of work being part of a first request; and
    the second unit of work being part of a second request different from the first request.

12. The computer program of claim 11 wherein the first-unit intermediate result is an intermediate result selected from the group consisting of a definition of a materialized view and a spool file.

13. The computer program of claim 11 wherein when determining that the properties of the first-unit intermediate result are similar to the properties of the second-unit intermediate result, the computer:
    defines properties of a spool file that will be required when executing the second unit of work; and
    finds that the properties of the temporary computer-stored intermediate result are identical to the properties of the spool file.

14. The computer program of claim 11 wherein the computer program further includes executable instructions that cause the computer to:
    determine that intermediate-result-dropping conditions have been met with respect to the first-unit intermediate result and, in response, delete the first-unit intermediate result.

15. The computer program of claim 11 wherein the computer program further includes executable instructions that cause the computer to:
    transfer ownership of the first-unit intermediate result from the first unit of work to the second unit of work.

* * * * *